(12) United States Patent
Chateau et al.

(10) Patent No.: US 12,403,564 B2
(45) Date of Patent: Sep. 2, 2025

(54) TREATMENT METHOD FOR A CUTTING PIECE

(71) Applicant: ArcelorMittal, Luxembourg (LU)

(72) Inventors: Frederic Chateau, Champtoce (FR); Julien Jeanneau, Carquefou (FR); Pierre Richet, Metz (FR); Florent Sponem, Vigy (FR)

(73) Assignee: ArcelorMittal, Luxembourg (LU)

( * ) Notice: Subject to any disclaimer, the term of this patent is extended or adjusted under 35 U.S.C. 154(b) by 1414 days.

(21) Appl. No.: 16/756,061

(22) PCT Filed: Nov. 15, 2018

(86) PCT No.: PCT/IB2018/058989
§ 371 (c)(1),
(2) Date: Apr. 14, 2020

(87) PCT Pub. No.: WO2019/097438
PCT Pub. Date: May 23, 2019

(65) Prior Publication Data
US 2021/0402566 A1 Dec. 30, 2021

(30) Foreign Application Priority Data

Nov. 15, 2017 (WO) .................. PCT/IB2017/057131

(51) Int. Cl.
*B23P 15/40* (2006.01)
*B24B 1/04* (2006.01)
(Continued)

(52) U.S. Cl.
CPC .............. *B24C 1/02* (2013.01); *B23P 15/406* (2013.01); *B24B 1/04* (2013.01); *B24C 1/10* (2013.01); *B24C 5/005* (2013.01); *B24C 11/00* (2013.01)

(58) Field of Classification Search
CPC .... B24C 1/02; B24C 1/04; B24C 1/06; B24C 1/10; B24C 5/005
See application file for complete search history.

(56) References Cited

U.S. PATENT DOCUMENTS

| 2,735,231 A | 2/1956 | Simjian |
| 5,048,191 A | 9/1991 | Hahn et al. |

(Continued)

FOREIGN PATENT DOCUMENTS

| AT | 502800 A4 | 6/2007 |
| CN | 1057222 A | 12/1991 |

(Continued)

OTHER PUBLICATIONS

See International Search Report of PCT/IB2018/058989, dated Feb. 15, 2019.
(Continued)

*Primary Examiner* — Sarang Afzali
(74) *Attorney, Agent, or Firm* — Davidson Kappel LLC

(57) ABSTRACT

A method of treatment of a cutting piece (2) is provided. This method includes a first step in which a cutting surface (5) of this cutting piece (2) is subjected to shots thrown by an ultrasonic shot peening apparatus (10) to become a cutting surface (5) with shot impacts, and a second step in which the cutting surface (5) with shot impacts is grinded over a chosen thickness to become a treated cutting surface (5).

13 Claims, 4 Drawing Sheets

(51) Int. Cl.
  *B24C 1/02* (2006.01)
  *B24C 1/10* (2006.01)
  *B24C 5/00* (2006.01)
  *B24C 11/00* (2006.01)

(56) References Cited

U.S. PATENT DOCUMENTS

| | | | |
|---|---|---|---|
| 5,992,204 A * | 11/1999 | Jonkka | B27L 11/005 |
| | | | 72/340 |
| 6,289,705 B1 | 9/2001 | DuQuenne et al. | |
| 6,336,844 B1 | 1/2002 | Duquene et al. | |
| 7,285,052 B1 | 10/2007 | Rowell | |
| 7,356,898 B2 * | 4/2008 | Matsutani | A61B 17/3211 |
| | | | 606/166 |
| 10,843,308 B2 * | 11/2020 | Rodriguez | B24C 3/18 |
| 2003/0115922 A1 | 6/2003 | Berthelet et al. | |
| 2006/0019120 A1 | 1/2006 | Jonsson et al. | |
| 2008/0092616 A1 | 4/2008 | Cheppe | |
| 2008/0282756 A1 | 11/2008 | Cheppe et al. | |
| 2010/0132177 A1 | 6/2010 | Thummler | |
| 2010/0239197 A1 | 9/2010 | Hojak et al. | |
| 2011/0030434 A1 | 2/2011 | Sancho | |

FOREIGN PATENT DOCUMENTS

| | | | | |
|---|---|---|---|---|
| CN | 1721107 A | 1/2006 | | |
| CN | 101708726 A | 5/2010 | | |
| EP | 0917934 A1 | 5/1999 | | |
| EP | 2708299 A1 * | 3/2014 | ............ | B23B 27/00 |
| JP | S56104845 U | 8/1981 | | |
| JP | H04107210 A | 4/1992 | | |
| JP | H04331070 A | 11/1992 | | |
| JP | 2002200561 A | 7/2002 | | |
| JP | 2004332896 A | 11/2004 | | |
| JP | 2017179434 A | 10/2017 | | |
| RU | 2133187 C1 | 7/1999 | | |
| RU | 2210602 C2 | 8/2003 | | |
| UA | 36526 A | 4/2001 | | |

OTHER PUBLICATIONS

"Fatigue and mechanical characteristics of nano-structured tool steel by ultrasonic cold forging technology" Chang-Min Suh et al.—Materials Science and Engineering A 443 (2007) p. 101-106.

* cited by examiner

TREATMENT METHOD FOR A CUTTING PIECE

The invention relates to a method of treatment of cutting pieces and to the associated equipment.

The invention concerns any type of industrial cutting piece comprising at least one cutting edge. The invention applies more specifically to a cutting piece like rotary knives or wheels comprising a cutting surface with two opposite sides and one or two cutting edges depending whether it further comprises or not a face binding these opposite sides whose width makes possible to define two cutting edges.

BACKGROUND

Rotary knives or wheels are notably used in side trimming equipment intended for trimming at least one longitudinal side of a metal strip. An example of such a side trimming equipment 1 is schematically illustrated in FIG. 1. In the non-limiting example illustrated in FIG. 1, the side trimming equipment 1 comprises two pairs of rotary knives 2 intended for trimming simultaneously the two longitudinal sides 3 of a metal strip 4. For instance, the strip 4 may be made of steel. Each longitudinal side 3 of the metal strip 4 passes continuously between the two rotary knives 2 of the corresponding pair so that a part of the metal strip 4 sheared to guarantee a good quality of edge and a fixed width. For instance such side trimming equipment 1 may be part of a pickling line or striping line in a cold rolling process An example of rotary knife 2, which can be part of one of the above mentioned pairs, is schematically illustrated in FIG. 2. It comprises a cutting surface 5 with two opposite sides 6 separated by a binding face 8 with a certain width, defining the circumference of the cutting piece 2 and extending between two parallel cutting edges 7.

The lifetime of rotary knives 2, which can be expressed as length of metal strip or number of coils of metal strip cut, depends on their state of wear which itself depends on the hardness and topography of the surface of the knives.

Several treatment methods have been proposed to increase hardness of cutting pieces, and notably rotary knives.

The publication "Fatigue and mechanical characteristics of nano-structured tool steel by ultrasonic cold forging technology" Chang-Min Suh et al.—Materials Science and Engineering A 443 (2007) p 101-106, discloses a treatment method named Ultrasonic cold forging technology (UCFT) which uses ultrasonic vibratory energy as a source and by which several tens of thousands of strikes per second are applied to the material surface at constant pressure. In the article this technology is applied to the trimming knives in a cold rolling process. According to this publication, UCFT is a nanostructured surface modification technology which can improve a hardness characteristic. However, as stated in this article, such technology only allows doubling the number of coils which can be cut by the trimming knives which have been previously treated by the UCFT technology, which is not sufficient.

SUMMARY OF THE INVENTION

It is an objective of the invention is to provide a method of treatment of industrial cutting pieces which would improve substantially their lifetime.

To this end, the invention relates to a method of treatment of a cutting piece which comprises a first step in which a cutting surface of this cutting piece is subjected to shots thrown by an ultrasonic shot peening apparatus to become a cutting surface with shot impacts, and a second step in which said cutting surface with shot impacts is grinded over a chosen thickness to become a treated cutting surface The method of the invention may also comprise the following optional characteristics considered separately or according to all possible technical combinations:

the cutting piece is overall circular in shape and comprises two opposite sides separated by a binding face defining the circumference of said cutting piece and extending between two cutting edges, and at least the cutting edges are masked during the first step.

in a first embodiment, the first step may comprise a first sub-step in which the binding face of said cutting surface is subjected to shots thrown by said ultrasonic shot peening apparatus while the opposite sides of said cutting surface are at least partially masked up to, and including, the cutting edges, and a second sub-step in which said opposite sides are subjected to shots thrown by said ultrasonic shot peening apparatus while said binding face with shot impacts is at least partially masked up to, and including, said cutting edges.

in a second embodiment, the first step may comprise a first sub-step in which opposite sides of said cutting surface are subjected to shots thrown by said ultrasonic shot peening apparatus while the binding face is at least partially masked up to, and including, the cutting edges, and a second sub-step in which said binding face is subjected to shots thrown by said ultrasonic shot peening apparatus while said opposite sides with shot impacts are at least partially masked up to, and including, said cutting edges.

in these embodiments said first step, said opposite sides of said cutting surface are masked on a height taken from the cutting edges which is comprised between 1 mm and 50 mm, preferably between 4 mm and 10 mm.

in said first step, said cutting surface is subjected to shot until it is covered by shot impacts on a surface chosen between 70% of its own full surface and 1000% of said full surface, preferably between 100% and 200%.

in said second step said thickness is chosen between 0.02 mm and 1.5 mm, preferably between 0.05 and 0.2 mm.

the shots are spherical balls with a diameter comprised between 0.5 mm and 5 mm.

in said first step the total weight of shots is comprised between 0.1 grams and 500 grams, preferably between 1 gram and 50 grams.

The invention relates also to an equipment for treating a cutting piece, this equipment comprising an ultrasonic shot peening apparatus arranged for throwing shot on a cutting surface of this cutting piece so that it becomes a cutting surface with shot impacts, and an grinding device arranged for grinding the cutting surface with shot impacts over a chosen thickness so that it becomes a treated cutting surface.

The equipment of the invention may also comprise the following optional characteristics considered separately or according to all possible technical combinations:

the grinding device may be arranged for grinding the cutting surface with shot impacts over a thickness that is chosen between 0.02 mm and 1.5 mm, preferably between 0.05 and 0.2 mm;

the ultrasonic shot peening apparatus may be arranged for throwing shots on the cutting surface until it is covered by shot impacts on a surface chosen between 700% of its own full surface and 1000% of this full surface, preferably between 100% and 200%;

the ultrasonic shot peening apparatus may be arranged for throwing shots having a diameter comprised between 0.5 mm and 5 mm;

the ultrasonic shot peening apparatus may be arranged for throwing shots having a total weight comprised between 0.1 grams and 500 grams, preferably between 1 gram and 50 grams;

the equipment may comprise a dedicated support set on a vibrating surface of the ultrasonic shot peening apparatus, supporting the cutting piece at least partly, and arranged for masking a terminal face of the cutting piece up to cutting edges. For instance, this support may comprise at least two movable pieces.

BRIEF DESCRIPTION OF THE DRAWINGS

Other characteristics and advantages of the invention will emerge clearly from its description, given below by way of example and which is in no way restrictive, with reference to the appended figures in which.

DETAILED DESCRIPTION

The invention aims, notably, at proposing a treatment method, and associated equipment, intended for treating a cutting piece in order to increase its hardness and to increase substantially its lifetime.

Figure 1:
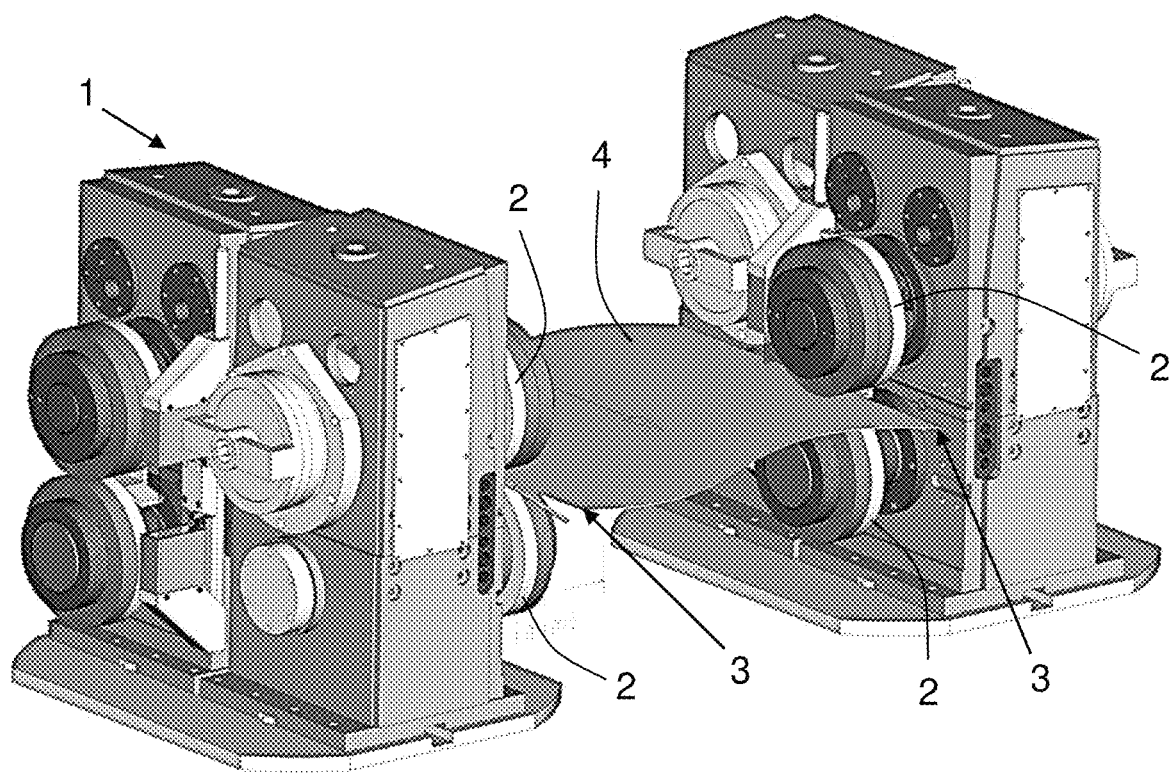
FIG. 1 illustrates schematically, in a perspective view, an example of side trimming equipment comprising two pairs of rotary knives intended for trimming simultaneously the two longitudinal sides of a steel strip.

In the following description it will be considered as an example that the cutting piece 2 is a rotary knife or wheel, such as the one illustrated in FIG. 2, and which can be used, for instance, in a side trimming equipment, such as side trimming equipment 1 illustrated in FIG. 1 and previously described on a pickling line or on a striping line. But the invention is not limited to this application. Indeed the invention concerns any type of cutting piece 2 as long as it comprises a cutting surface 5 with two opposite sides 6 separated by one or two cutting edges 7 depending whether it further comprises or not a binding face 8. So, a cutting piece 2 to treat may be a knife, scissors, a shear, a scythe or a blade, for instance.

Figure 2:
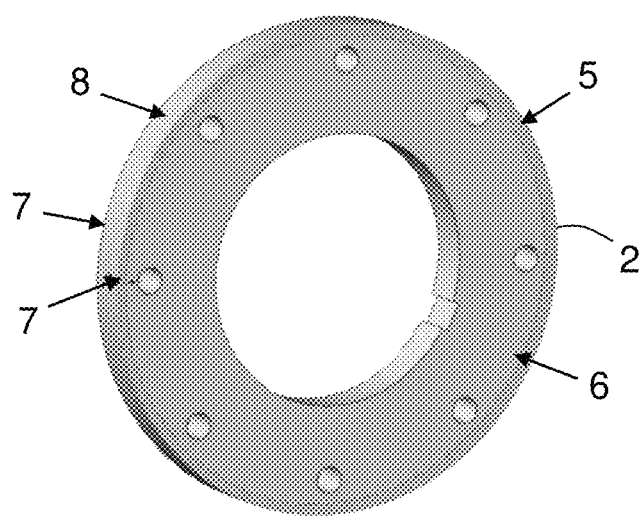
FIG. 2 illustrates schematically, in a perspective view, an example of a knife on which a method according to the invention may be applied, and which can be used into an equipment such as the one illustrated in FIG. 1.
Figure 4:
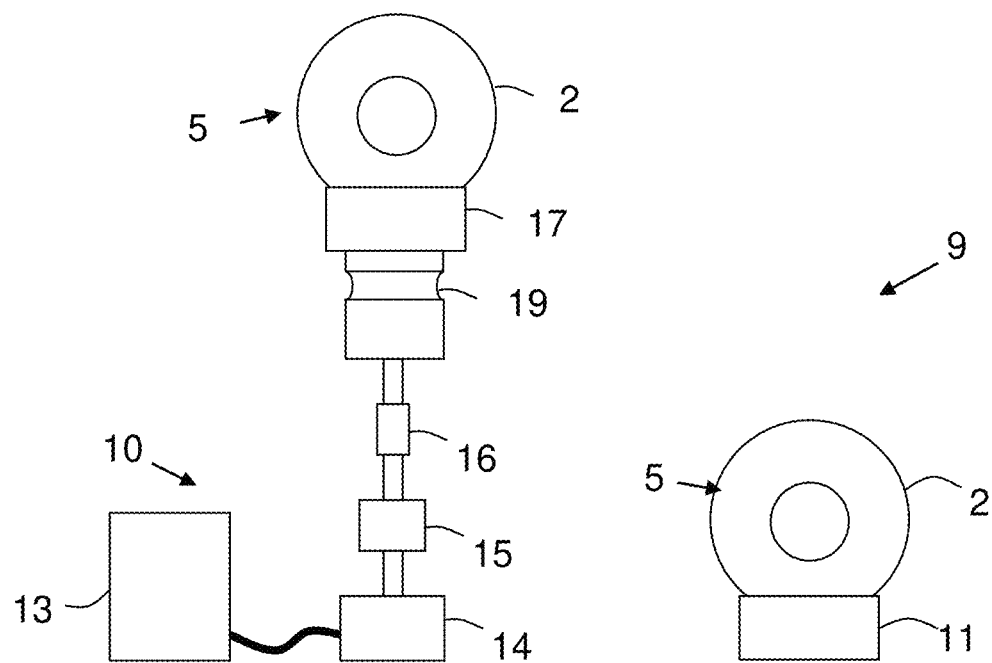
FIG. 4 illustrates schematically and functionally an example of equipment according to the invention.

As mentioned above, the invention proposes a treatment method intended for treating a cutting piece 2 (here a rotary knife illustrated in FIG. 2). Such a treatment method can be implemented by means of equipment (9) according to the invention, comprising at least an ultrasonic shot peening apparatus 10 and a grinding device 1, as illustrated in FIG. 4.

The treatment method according to the invention is described below with reference to the example of algorithm schematically illustrated in FIG. 3. It comprises two steps.

In a first step, a cutting surface 5 of the cutting piece 2 is subjected to shots 12 thrown by the ultrasonic shot peening apparatus 10 to become a cutting surface 5 with shot impacts.

Figure 3:
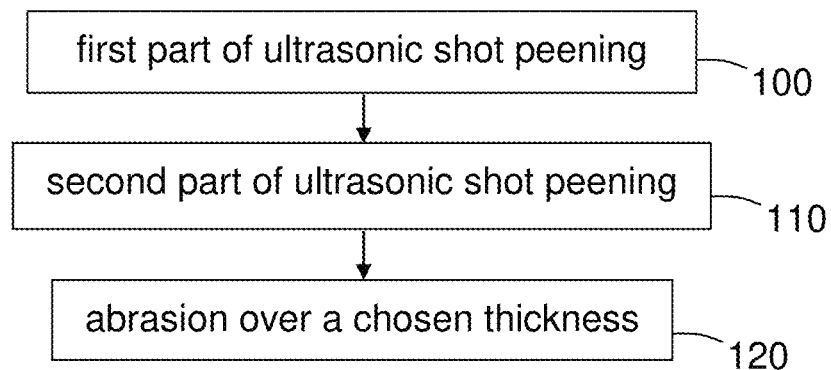
FIG. 3 illustrates schematically an example of a treatment method according to the invention.

This first step is represented in FIG. 3 by the sub-steps 100 and 110.

For instance, and as illustrated schematically and functionally in FIG. 4, the ultrasonic shot peening apparatus 10 may comprise at least a generator 13, a piezo-electric transducer 14, a sonotrode 19 and a terminal part 17 also called a peening fixture. Optionally, as shown on the figure, a pre-booster 15 and a booster 16 can be added.

The generator 13 is arranged for delivering a sinusoidal electric field intended for exciting the piezo-electric transducer 14. The piezo-electric transducer 14 is arranged for converting the electric energy of the sinusoidal electric field into an ultrasonic vibration, whose frequency is for example comprised between 10 and 60 kHz, preferably between 15 and 25 kHz, and more preferably of 20 kHz. The pre-booster 15 and booster 16 are arranged for increasing the amplitude of the ultrasonic vibration delivered by the piezo-electric transducer 14. The sonotrode 19, as the final vibrating component, is use to throw the shot 12 (see FIG. 5) against the cutting piece 2. The terminal part 17 comprises a housing with a treatment chamber where the cutting surface 5 of the cutting piece 2 is temporarily located with the shots 12. The ultrasonic vibration provided by the sonotrode 19 induces longitudinal vibrations which randomly throws shot 12 into the treatment chamber and therefore on the surface of the cutting surface 5 that is inside the treatment chamber and unmasked, as illustrated in FIGS. 5 to 8. Therefore, the full surface of the cutting surface 5 is progressively treated which increases homogeneously its hardness not only in surface but also in depth (or in subsurface volume).

When the full surface of the cutting surface 5 cannot be located into the treatment chamber, the cutting piece 2 is moved relative to the terminal part 17. It may be moved in a continuous manner or sequentially (i.e. each time it is considered that the portion of the cutting surface 5 inside the treatment chamber has been sufficiently subjected to shot impacts). So, in the case where the cutting piece 2 is a rotary knife it may be driven in rotation by an axis of a dedicated electrical motor, for instance. In this last embodiment, between 15 to 25 rotations of the cutting piece 2 may be performed in order to homogenize the shot impacts. For instance, the rotation speed may be less than 10 rpm. For instance, this rotation speed is preferably equal to 4 or 5 rpm.

For instance, in the first step each portion of the cutting surface 5 may be subjected to shot 12 until it is covered by shot impacts on a surface chosen between 70% of its own full surface and 1000% of this full surface, preferably between 100% of its own full surface and 200% of this full surface. 100% means that the shot of the surface is carried out for a time T until 100% of the surface is covered with shot impacts. 200% means that the shot of the surface is carried out for a time 2 T. 70% means that the shot impacts (12) do not strictly cover the full surface, but it does not mean that only 70% of the blade is treated, indeed the diameter of the shots is not the diameter of the treated surface, it may be larger. For instance, each portion of the cutting surface 5 may be subjected to shot 12 until it is covered by shot impacts on a surface equal to 125% (exposition time of 1.25 T) of its own full surface.

Shots are preferably substantially spherical, likes balls, in particular with maximum tolerance of ±60 micrometers ([mu]m) on sphericity. The shot preferably comprises at least one non-ferrous material at its surface, advantageously tungsten carbide (WC). The shot may be made entirely out of tungsten carbide, but they could be also made of steel, stainless steel, ceramic, glass, nickel base alloy and titanium alloy. The shots 12 have preferably a diameter comprised between 0.5 mm and 5 mm.

Also for instance, in the first step one may provide the treatment chamber with shots 12 having a total weight comprised between 0.1 grams and 500 grams, preferably between 1 gram and 50 grams. One of skill in the art can adjust the total weight of the shots 12 according to the volume of the treatment chamber.

In a second step of the treatment method the cutting surface 5 with shot impacts is ground over a chosen thickness to become a treated cutting surface 5. This second step is represented in FIG. 3 by the step 120.

This chosen material removal thickness is carried out by the grinding device 11 of the equipment 9.

For instance, this grinding may consist in a controlled grinding using grindstones or millstones.

Also for instance, in the second step the thickness may be chosen between 0.02 mm and 1.5 mm, preferably between 0.05 and 0.2 mm.

At least three different implementations of the first step in the first example may be envisaged.

In a first implementation the first step may comprise first 100 and second 110 sub-steps, as illustrated in the non-limiting example of FIG. 3.

Figure 5:
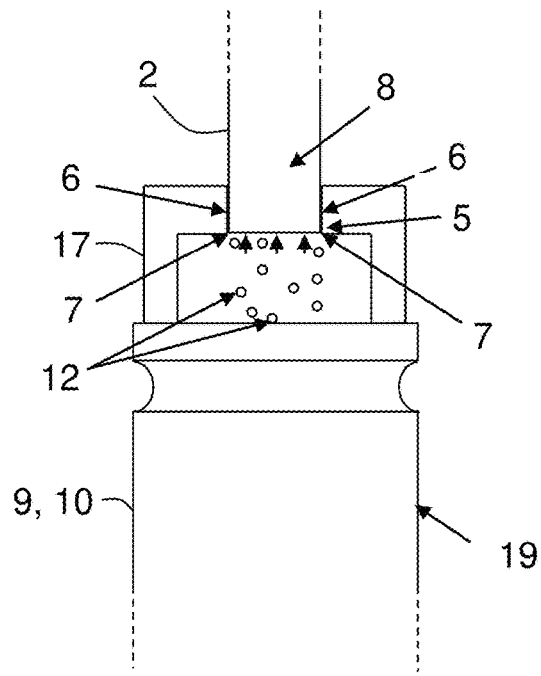
FIG. 5 illustrates schematically, in a cross section view, a part of an ultrasonic shot peening apparatus of an equipment according to the invention, during a first sub-step of a first example of first step of a method according to the invention.

In a first sub-step 100 illustrated in FIG. 5, the binding face 8 is subjected to shots 12 thrown by the ultrasonic shot peening apparatus 10 while the opposite sides 6 of the cutting surface 5 are masked up to its cutting edges 7 that separate them respectively from the binding face 8. This masking up to the cutting edges 7 is intended to prevent damage to them. It may be realized by means of upper edges of the housing of the terminal part 17 of the ultrasonic shot peening apparatus 10 after having hung the cutting piece 2 over the vibrating surface of the sonotrode 19 so that its opposite sides 6 are fully masked by these upper edges. In a variant it is possible to stick a dedicated mask on the opposite sides 6 in order to mask them entirely.

Figure 6:
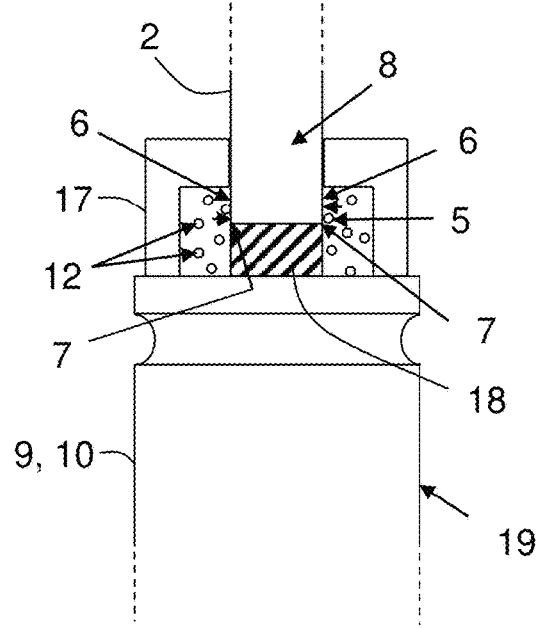
FIG. 6 illustrates schematically, in a cross section view, the part of the ultrasonic shot peening apparatus illustrated in FIG. 5, during a second sub-step of the first example of first step of a method according to the invention.
Figure 7:
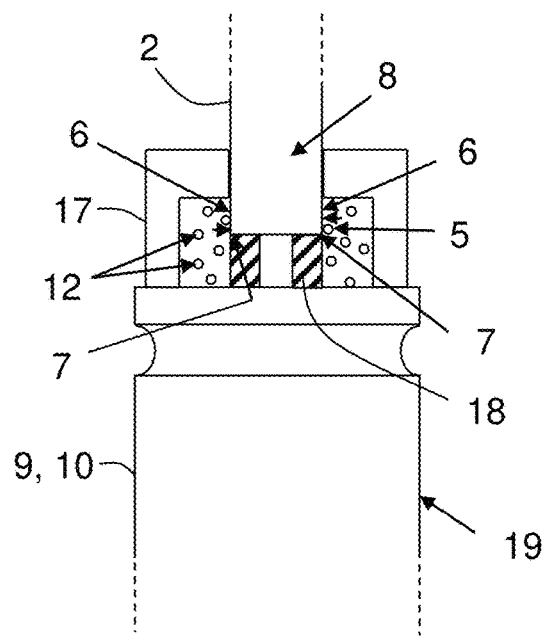
FIG. 7 illustrates schematically, in a cross section view, a variant of embodiment of the part of the ultrasonic shot peening apparatus illustrated in FIG. 5, during the second sub-step of the first example of first step of the method according to the invention.

In a second sub-step 110 illustrated in FIGS. 6 and 7, the opposite sides 6 are subjected to shots 12 thrown by the ultrasonic shot peening apparatus 10 while the binding face 8 already subjected to shot impacts is masked up to the cutting edges 7. This masking up to the cutting edges 7 is also intended to prevent damage to them. It may be realized by means of an upper face of a dedicated support or extension 18 set on the vibrating surface of the treatment chamber and which supports the cutting piece 2 (at least partly). Such a dedicated support or extension 18 may comprise one piece as illustrated in FIG. 6 or several pieces which may be moved if necessary to support thicker cutting pieces 2 as illustrated in FIG. 7. So it may be integral as illustrated in FIG. 6 or not as illustrated in FIG. 7, in order to suit different sizes of cutting pieces 2. In another variant it is possible to stick a dedicated mask on the binding face 8 in order to mask it entirely.

In a second implementation the first 100 and second 110 sub-steps of the first implementation are reversed. So, in a first sub-step the opposite sides 6 are subjected to shots 12 thrown by the ultrasonic shot peening apparatus 10 while the binding face 8 of the cutting surface 5 is masked up to the cutting edges 7, and in a second sub-step the binding face 8 is subjected to shots 12 thrown by the ultrasonic shot peening apparatus 10 while the opposite sides 6 with shot impacts are masked up to the cutting edges 7.

According to the invention, at least the cutting edges 7 are masked up to avoid any damage on their surface. For instance, in the first or second implementation, the opposite sides 6 of the cutting surface 5 may be masked from the cutting edges 7 on a height comprised between 1 mm and 50 mm, preferably between 1 mm and 10 mm, and more preferably between 4 mm and 10 mm.

In a third implementation, only the opposite sides 6 are subjected to shots 12 thrown by the ultrasonic shot peening apparatus 10 under the same operating conditions as for the second sub-step of the first implementation and the first sub-step of the second implementation. This third implementation is carried out when the cutting surface 5 has been previously treated by the first or the second implementation because the opposite sides 6 wear faster than the binding face 8.

Figure 8:
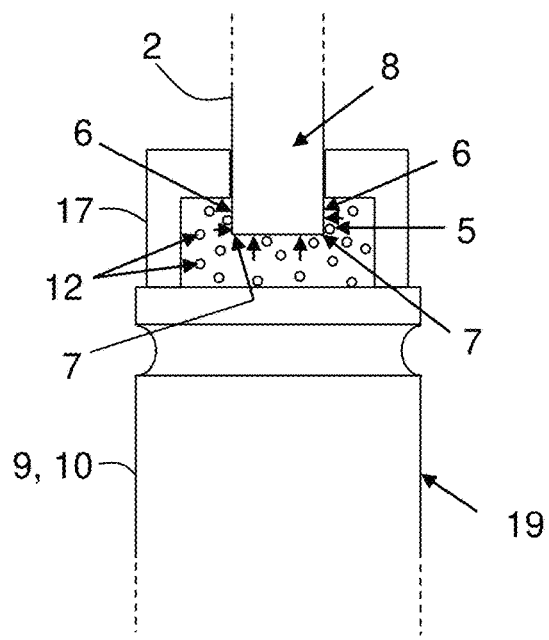
FIG. 8 illustrates schematically, in a cross section view, a part of an ultrasonic shot peening apparatus of an equipment according to the invention, during a second example of first step of a method according to the invention.

In a second example FIG. 8 illustrates schematically, in a cross section view, a part of an ultrasonic shot peening apparatus of an equipment according to the invention for performing the first step of a method according to the invention.

Two known treatment methods named ultrasonic needle peening method (or UNP, equivalent to Ultrasonic cold forging technology previously described) and ultrasonic needle straightening method (or UNS), have been performed by means of apparatuses such as the ones produced by SONATS under references STRESSVOYAGER UNP (also called NOMAD) and STRESSVOYAGER UNS. In these methods, needles are guided on an end-piece at the extremity of a peening head. Thanks to the ultrasonic vibration, needles (or impactors) are thrown against the surface area to be treated and have a high frequency back and forth movement.

Another method named ultrasonic shot peening (or USP) method has been tested. This method can be performed by means of an apparatus such as the one produced by SONATS under reference STRESSVOYAGER USP. It performs a surface treatment by throwing shots on the cutting surface of a cutting piece in order to improve its hardness. Shots are propelled by metallic elements forming an "acoustic block" vibrating with an ultrasonic frequency. A generator delivers a sinusoidal electric field which excites a piezo-electric transducer to convert this electric energy into an ultrasonic vibration. The vibration delivered by the piezo-electric transducer being too small for throwing shots, it is increased by a serial of pre-booster and booster to reach a value that is enough efficient for a terminal part of the acoustic block named the "sonotrode". This terminal part is covered by a peening fixture comprises a housing with a treatment chamber where the cutting surface of the rotary knife is temporarily located with the shots. The longitudinal vibration of the sonotrode surface randomly throws the shots into the treatment chamber. Therefore, the treatment is homogeneous on all surfaces of the enclosure and consequently on the cutting surface to treat.

Figure 9:
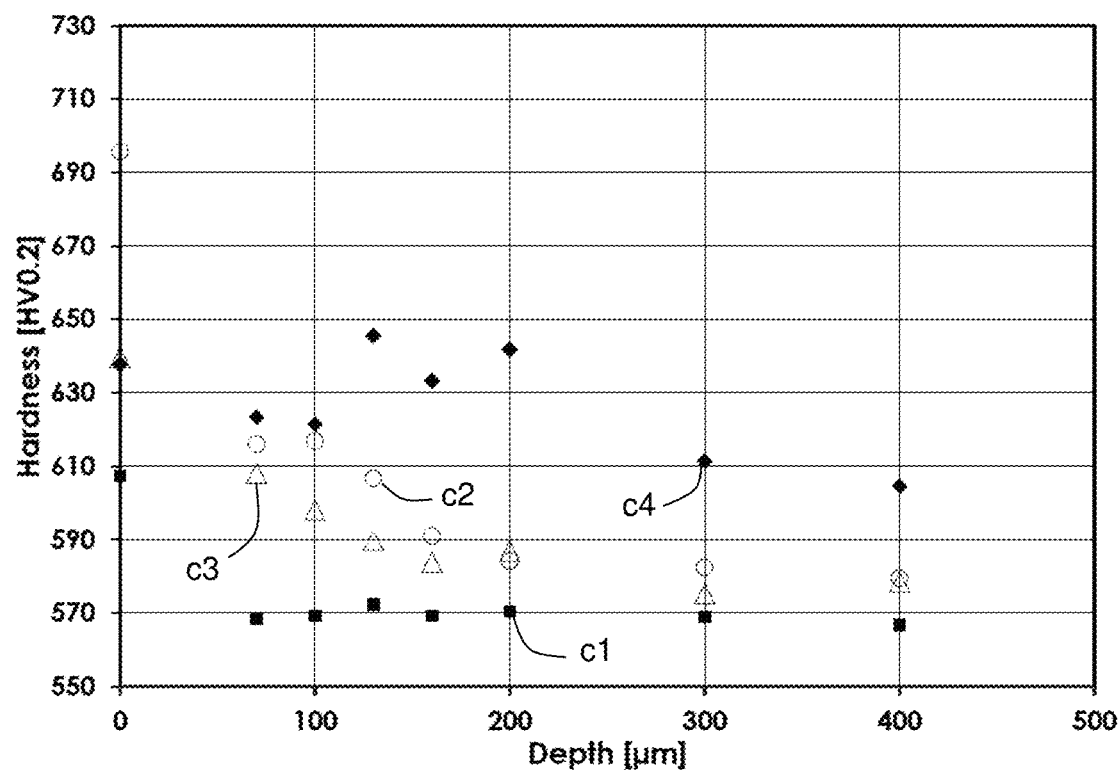
FIG. 9 illustrates schematically in a diagram the evolution of the hardness of a knife without the treatment method according to the invention, and of three knives having received the treatment method according to the invention respectively with three different sets of parameter values, as a function of the depth.

Comparative results without any surface treatment and with the treatment according to the invention are illustrated in the diagram of FIG. 9, in the case where the cutting piece 2 is a rotary knife.

The first curve c1 illustrates the evolution of the micro hardness of a first untreated rotary knife 2 as a function of the depth (in µm). The second curve c2 illustrates the evolution of the micro hardness of a second rotary knife 2 having been treated according to the invention with shots 12 having a first diameter equal to 1.5 mm, a first total weight of shots 12 equal to 4 grams, and a first coverage of the cutting surface 5 by shot impacts equal to 125%, as a function of the depth. The third curve c3 illustrates the evolution of the hardness of a third rotary knife 2 having been treated according to the invention with shots 12 having the first diameter, the first total weight of shots 12, and a second coverage of the cutting surface 5 by shot impacts equal to 3000%, as a function of the depth. The fourth curve c4 illustrates the evolution of the hardness of a fourth rotary knife 2 having been treated according to the invention with shots 12 having a second diameter equal to 4 mm, a second total weight of shots 12 equal to 10 grams, and the first coverage of the cutting surface 5 by shot impacts equal to 125%, as a function of the depth.

The second c2, third c3 and fourth c4 curves show increases of the hardness compare to the first curve c1 (without treatment), not only in surface but also in depth (or bulky) and particularly at 1 mm of depth. The fourth curve c4 shows the best results in depth and therefore the corresponding set of parameters can be actually considered as optimal for the considered rotary knife 2.

Thanks to the invention, an important increase of the cutting piece lifetime is obtained. For instance, more than 12270 tons of metal strip may be cut with the same rotary knife, which corresponds to around 380 km of metal strip that may be cut without any defect with the same rotary knife, while only 75 km can be obtained with a traditional rotary knife. Therefore, according to the method and the equipment of the invention, the length of metal strip subjected to the cutting with the same knives may be multiplied by 5.

What is claimed is:

1. A method for treatment of a cutting piece, the method comprising:
    a first step, throwing shots by an ultrasonic shot peening apparatus at the cutting piece to define a cutting surface with shot impacts; and
    a second step, grinding the cutting surface with the shot impacts over a chosen thickness to define a treated cutting surface;
    wherein the cutting piece is a rotary knife.

2. The method as recited in claim 1 wherein the cutting piece is overall circular in shape and includes two opposite sides separated by a binding face defining a circumference of the cutting piece and extending between two cutting edges, and wherein at least the cutting edges are masked during the first step.

3. The method as recited in claim 2 wherein the first step includes:
    a first sub-step, subjecting the binding face of the cutting surface to the shots thrown by the ultrasonic shot peening apparatus while the two opposite sides are at least partially masked up to, and including, the cutting edges; and
    a second sub-step, subjecting the two opposite sides to the shots thrown by the ultrasonic shot peening apparatus while the binding face with shot impacts is at least partially masked up to, and including, the cutting edges.

4. The method as recited in claim 2 wherein the first step includes:
    a first sub-step, subjecting opposite sides of the cutting surface to the shots thrown by the ultrasonic shot peening apparatus while the binding face is at least partially masked up to, and including, the cutting edges; and
    a second sub-step, subjecting the binding face to the shots thrown by the ultrasonic shot peening apparatus while the opposite sides with the shot impacts are at least partially masked up to, and including, the cutting edges.

5. The method as recited in claim 2 wherein in said first step, the two opposite sides of the cutting surface are masked on a height taken from the cutting edges which is between 1 mm and 50 mm.

6. The method as recited in claim 5 wherein the height is between 4 mm and 10 mm.

7. The method as recited in claim 1 wherein in the first step the cutting surface is subjected to the shots for between 0.7T and 10T until the cutting surface is covered by shot impacts, wherein T is defined as the time needed to cover 100% of the surface with shot impacts.

8. The method as recited in claim 7 wherein the cutting surface is subjected to the shots for between T and 2T.

9. The method as recited in claim 1 wherein in the second step the thickness is chosen between 0.02 mm and 1.5 mm.

10. The method as recited in claim 9 wherein in the second step the thickness is chosen between 0.05 mm and 0.2 mm.

11. The method as recited in claim 1 wherein the shots are spherical balls each having a diameter comprised between 0.5 mm and 5 mm.

12. The method as recited in claim 1 wherein in the first step a total weight of the shots thrown is between 0.1 grams and 500 grams.

13. The method as recited in claim 12 wherein in the first step a total weight of the shots thrown is between 1 grams and 50 grams.

* * * * *